US012491130B1

(12) United States Patent
Zhao

(10) Patent No.: US 12,491,130 B1
(45) Date of Patent: Dec. 9, 2025

(54) HOLLOW-STRUCTURED VIBRATION MASSAGER

(71) Applicant: Dongguan Yishuo Electronic Technology Co., Ltd, Guangdong (CN)

(72) Inventor: Quan Zhao, Guangdong (CN)

( * ) Notice: Subject to any disclaimer, the term of this patent is extended or adjusted under 35 U.S.C. 154(b) by 0 days.

(21) Appl. No.: 19/193,066

(22) Filed: Apr. 29, 2025

(30) Foreign Application Priority Data

Apr. 25, 2025 (CN) ......................... 202520801775.2

(51) Int. Cl.

*A61H 23/02* (2006.01)
*A61H 23/00* (2006.01)
*A61H 19/00* (2006.01)

(52) U.S. Cl.

CPC ....... *A61H 23/0254* (2013.01); *A61H 23/006* (2013.01); *A61H 19/44* (2013.01); *A61H 2201/1436* (2013.01); *A61H 2201/1669* (2013.01)

(58) Field of Classification Search

CPC .............. A61H 19/00; A61H 19/40–44; A61H 23/0254; A61H 15/0078; A61H 15/0085; A61H 2201/1669; A61H 2201/1436; A61H 23/006; A61H 21/00; A61H 7/004–005; A61H 7/007

See application file for complete search history.

(56) References Cited

U.S. PATENT DOCUMENTS 5,470,303 A * 11/1995 Leonard ................. A61H 19/34 600/38
9,789,022 B1 * 10/2017 Nam ...................... A61H 1/008
12,245,982 B1 * 3/2025 Zhao .................. A61H 23/0263
12,280,004 B1 * 4/2025 Zhao .................. A61H 23/0254
2007/0179336 A1 * 8/2007 Knyrim .................. A61H 21/00 600/38
2008/0194907 A1 * 8/2008 Lin ........................ A61H 19/44 600/38
2009/0069730 A1 * 3/2009 Knyrim .............. A61H 23/0263 601/134

(Continued)

FOREIGN PATENT DOCUMENTS

CA 2245286 A1 * 3/2000 ............. A01K 85/18
CN 203802776 U * 9/2014

(Continued)

*Primary Examiner* — Tu A Vo

(57) ABSTRACT

A hollow-structured vibration massager includes a soft rubber sleeve, wherein a hard shell is sleeved inside the soft rubber sleeve; a first motor is fixed inside the hard shell, and a drive end of the first motor is connected to a main crankshaft; an auxiliary crankshaft is fixed outside the main crankshaft, and a plurality of serpentine plates are slidably connected outside the main crankshaft; a soft rubber tube is slidably connected to a top end of the soft rubber sleeve, and a hollow opening is provided inside the soft rubber tube; the first motor is configured to drive the main crankshaft and the auxiliary crankshaft to rotate, thereby propelling the serpentine plates into wave-like motion inside the hollow opening. The rotating disks drive the transmission columns to rotate, causing the reciprocating frame to perform arc-shaped reciprocating motion, thereby actuating multiple auxiliary heads to deliver varied tactile stimulation.

8 Claims, 6 Drawing Sheets

(56) References Cited

U.S. PATENT DOCUMENTS

| | | | | |
|---|---|---|---|---|
| 2009/0198158 | A1* | 8/2009 | Nan | A61H 23/0254 601/87 |
| 2010/0130897 | A1* | 5/2010 | Knyrim | A61H 19/44 601/89 |
| 2010/0152631 | A1* | 6/2010 | Knyrim | A61H 23/0254 601/89 |
| 2012/0071800 | A1* | 3/2012 | Knyrim | A61H 19/40 601/113 |
| 2017/0020775 | A1* | 1/2017 | Rydel | A61H 19/44 |
| 2023/0346634 | A1* | 11/2023 | Wu | A61H 23/004 |
| 2024/0099929 | A1* | 3/2024 | Qian | A61H 19/32 |
| 2025/0032348 | A1* | 1/2025 | Li | A61H 7/007 |
| 2025/0177239 | A1* | 6/2025 | Huang | A61H 23/0254 |

FOREIGN PATENT DOCUMENTS

| | | | | | |
|---|---|---|---|---|---|
| CN | 104825322 | A | * | 8/2015 | |
| CN | 204798329 | U | * | 11/2015 | |
| CN | 205434313 | U | * | 8/2016 | |
| CN | 208785228 | U | * | 4/2019 | |
| CN | 208905792 | U | * | 5/2019 | |
| CN | 209059922 | U | * | 7/2019 | |
| CN | 209270261 | U | * | 8/2019 | |
| CN | 209301659 | U | * | 8/2019 | |
| CN | 216252404 | U | * | 4/2022 | |
| CN | 118078604 | A | * | 5/2024 | A61H 23/0263 |
| CN | 118845439 | A | * | 10/2024 | A61H 23/02 |
| CN | 119857046 | A | * | 4/2025 | A61H 23/006 |
| DE | 202024106176 | U1 | * | 11/2024 | A61H 19/30 |

* cited by examiner

HOLLOW-STRUCTURED VIBRATION MASSAGER

TECHNICAL FIELD

The invention relates to the technical field of massagers, and in particular to a hollow-structured vibration massager.

BACKGROUND ART

Massagers are a new generation of health care equipment developed based on physics, bionics, bioelectricity, traditional Chinese medicine and many years of clinical practice. They stimulate the human body through mechanical vibration or high-frequency mechanical vibration, promote blood circulation, accelerate metabolism, relieve muscle fatigue and soreness, and improve the function of the nervous system. Safe massagers are easy for users to check them, thereby extending their service life.

When using the neck massager, first check its appearance and component connections, and place it in a stable position. The user sits or lies upright and relaxes, and slightly adjusts the head for a good fit. After turning on the power, adjust the intensity and mode according to personal comfort. Aim the massager at the neck and fix it. Press the start button to start the massage, and the user can feel the simulated professional technique.

However, in the prior art, some massagers can only provide massage effects to users during use, and can only simply relax muscles. They cannot be flexibly adjusted according to the user's real-time physical condition changes, and cannot achieve multiple effects such as deep relaxation and conditioning. Therefore, in view of the above shortcomings, a hollow-structured vibration massager is proposed to solve the above problems.

SUMMARY OF THE INVENTION

In view of the deficiencies of the prior art, the invention provides a hollow-structured vibration massager, aiming to improve the problem that some massagers in the prior art can only achieve a single effect and cannot be flexibly adjusted during use.

In order to achieve the above purpose, the invention adopts the following technical solutions: a hollow-structured vibration massager, comprising a soft rubber sleeve, wherein a hard shell is sleeved inside the soft rubber sleeve; a first motor is fixed inside the hard shell, and a drive end of the first motor is connected to a main crankshaft; an auxiliary crankshaft is fixed outside the main crankshaft, and a plurality of serpentine plates are slidably connected outside the main crankshaft; a soft rubber tube is slidably connected to a top end of the soft rubber sleeve, and a hollow opening is provided inside the soft rubber tube; the first motor is configured to drive the main crankshaft and the auxiliary crankshaft to rotate, thereby propelling the serpentine plates into wave-like motion inside the hollow opening.

Preferably, rubber pads are fixed to left and right ends of the soft rubber tube, and a sleeve head is fixed to a top of the soft rubber tube; a vibration electric motor is fixed to an inner bottom of the sleeve head; a third motor is fixed to a left end of the hard shell, and a drive end of the third motor is connected to a crosshead; a plurality of rotating disks are fixed outside the crosshead, and a transmission column is fixed to a left end of the rotating disk; a reciprocating frame is fixed to a left end of the transmission column, and a fixing frame is fixed outside the reciprocating frame; a vibration motor is fixed inside the fixing frame, and an auxiliary head is fixed to a top of the vibration motor.

Preferably, side plates are fixed to left and right sides of the soft rubber tube, and sliding plates are slidably connected to left and right ends of the soft rubber sleeve.

Preferably, fixing plates are fixed to front and rear sides of the sliding plate, and second springs are fixed to far sides of the fixing plates.

Preferably, two through holes are provided inside the serpentine plate, and the main crankshaft and the auxiliary crankshaft are slidably connected inside the through holes.

Preferably, a battery pack is fixed to an inner bottom end of the hard shell, and a cover plate is fixed to a left end of the soft rubber sleeve.

Preferably, limit openings are provided at left and right ends of a top of the soft rubber sleeve, and the side plate is slidably connected inside the limit opening.

Preferably, a bottom side of the sliding plate is slidably connected to a top side of the side plate, and far ends of the second springs are respectively fixed to the left and right ends of the top of the soft rubber sleeve.

Working principle: upon activating the first motor, the main crankshaft and auxiliary crankshaft are driven to rotate synchronously. The serpentine plates, utilizing the through holes inside, are propelled by the main crankshaft and auxiliary crankshaft to reciprocate left and right, striking the user's skin via rubber pads.

Simultaneously, activating the third motor drives the crosshead to rotate, which in turn drives the rotating disks to rotate. Depending on requirements, two or more rotating disks are installed. The rotating disks drive the transmission columns to rotate, causing the reciprocating frame to perform arc-shaped reciprocating motion, thereby actuating multiple auxiliary heads to deliver varied tactile stimulation to the skin. The vibration motor further transmits vibrations to the auxiliary heads for percussive massage.

The two sliding plates are pulled to slide toward the opposite side, thereby driving the fixing plate to slide and squeeze the second spring, so that the second spring can store elastic potential energy, thereby giving the sliding plate a force in the opposite direction through the fixing plate to reset. At this time, the sliding plate slides away from the surface of the side plate, and the soft rubber tube can be quickly removed for cleaning or replacement, thereby avoiding damage to the massage and inconvenience, thereby improving its safety. After that, the side plate is engaged along the limit opening, by releasing the pulling force on the sliding plate, the resetting force of the second spring is transmitted to the sliding plate through the fixing plate to reset and slide to the surface of the side plate for engagement, and at least one rod body and at least one handle are positioned.

The hollow-structured vibration massager provided by the invention has the following advantageous effects.

1. The rotating disks drive the transmission columns to rotate, causing the reciprocating frame to perform arc-shaped reciprocating motion, thereby actuating multiple auxiliary heads to deliver varied tactile stimulation to the skin. The vibration motor further transmits vibrations to the auxiliary heads for percussive massage.
2. The fixing plate is driven to slide and squeeze the second spring, so that the second spring can store elastic potential energy, thereby giving the sliding plate a force in the opposite direction through the fixing plate to reset. At this time, the sliding plate slides away from the surface of the side plate, and the soft rubber tube can be quickly removed for cleaning or replacement, thereby avoiding damage to the massage and inconvenience, thereby improving its safety.

In the figures: 1 refers to the soft rubber sleeve; 2 refers to the hard shell; 3 refers to the first motor; 4 refers to the main crankshaft; 5 refers to the auxiliary crankshaft; 6 refers to the serpentine plate; 7 refers to the through hole; 8 refers to the soft rubber tube; 9 refers to the hollow opening; 10 refers to the rubber pad; 11 refers to the sleeve head; 12 refers to the vibration electric motor; 13 refers to the auxiliary head; 14 refers to the side plate; 15 refers to the limit opening; 16 refers to the sliding plate; 17 refers to the fixing plate; 18 refers to the second spring; 19 refers to the battery pack; 20 refers to the cover plate; 21 refers to the third motor; 22 refers to the crosshead; 23 refers to the rotating disk; 24 refers to the transmission column; 25 refers to the reciprocating frame; 26 refers to the fixing frame; 27 refers to the vibration motor.

SPECIFIC EMBODIMENT OF THE INVENTION

The technical solutions in the embodiments of the invention will be clearly and completely described hereinafter with reference to the drawings in the embodiments of the invention. Obviously, the described embodiments are only a part of the embodiments of the invention, rather than all the embodiments. Based on the embodiments of the invention, all other embodiments obtained by those of ordinary skill in the art without creative efforts shall fall within the protection scope of the invention.

Figure 1:
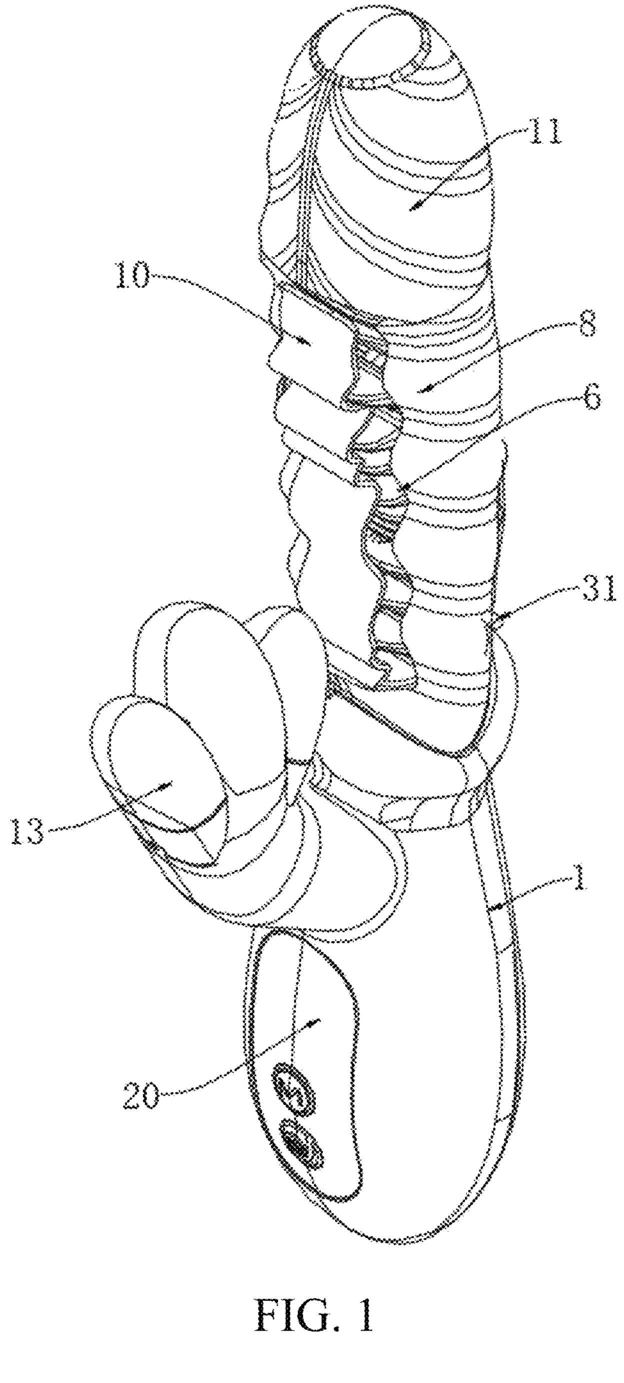
FIG. 1 is a perspective view of the hollow-structured vibration massager according to the invention.
Figure 2:
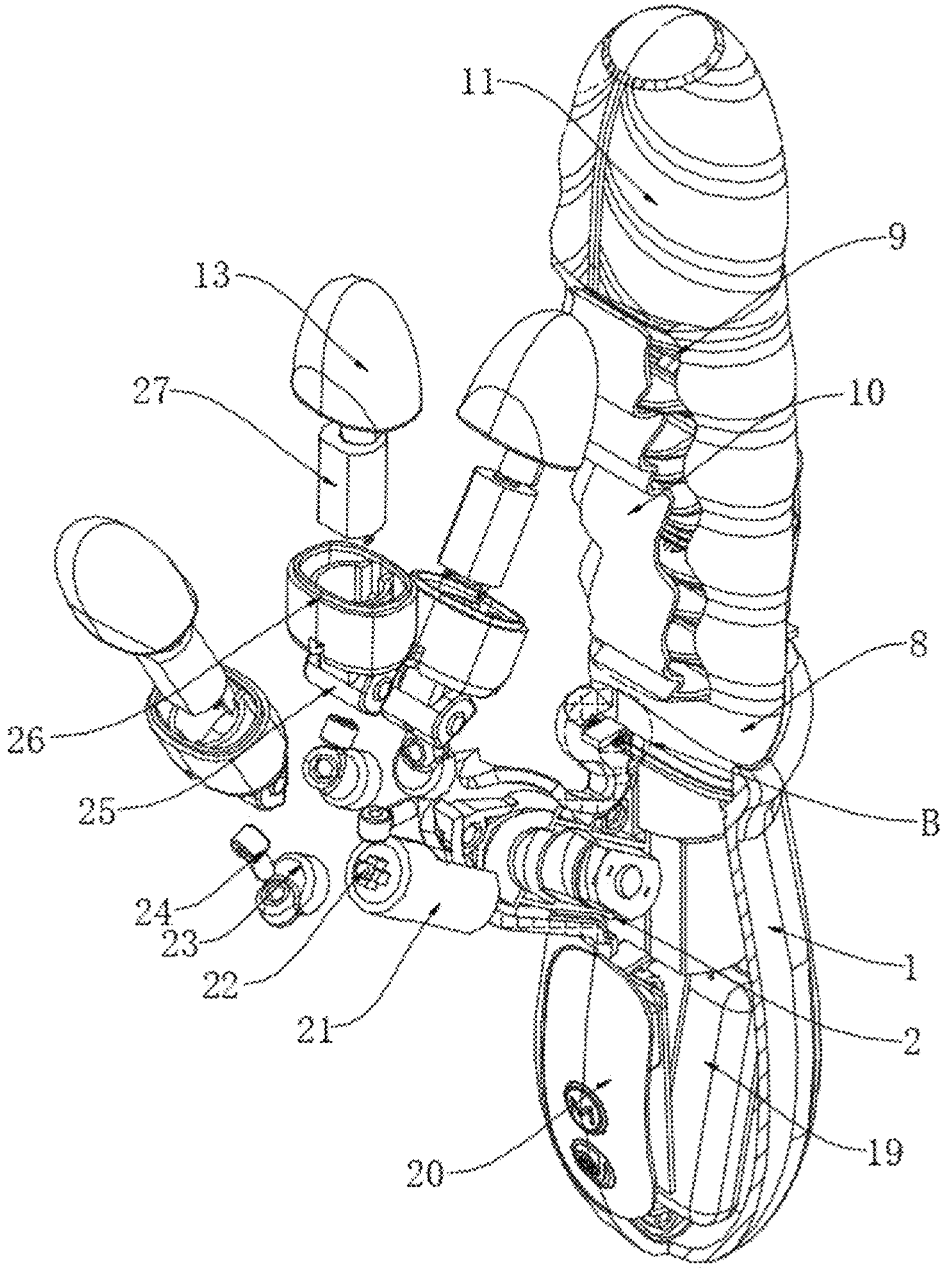
FIG. 2 is a schematic structural diagram of the auxiliary head in the hollow-structured vibration massager according to the invention.
Figure 3:
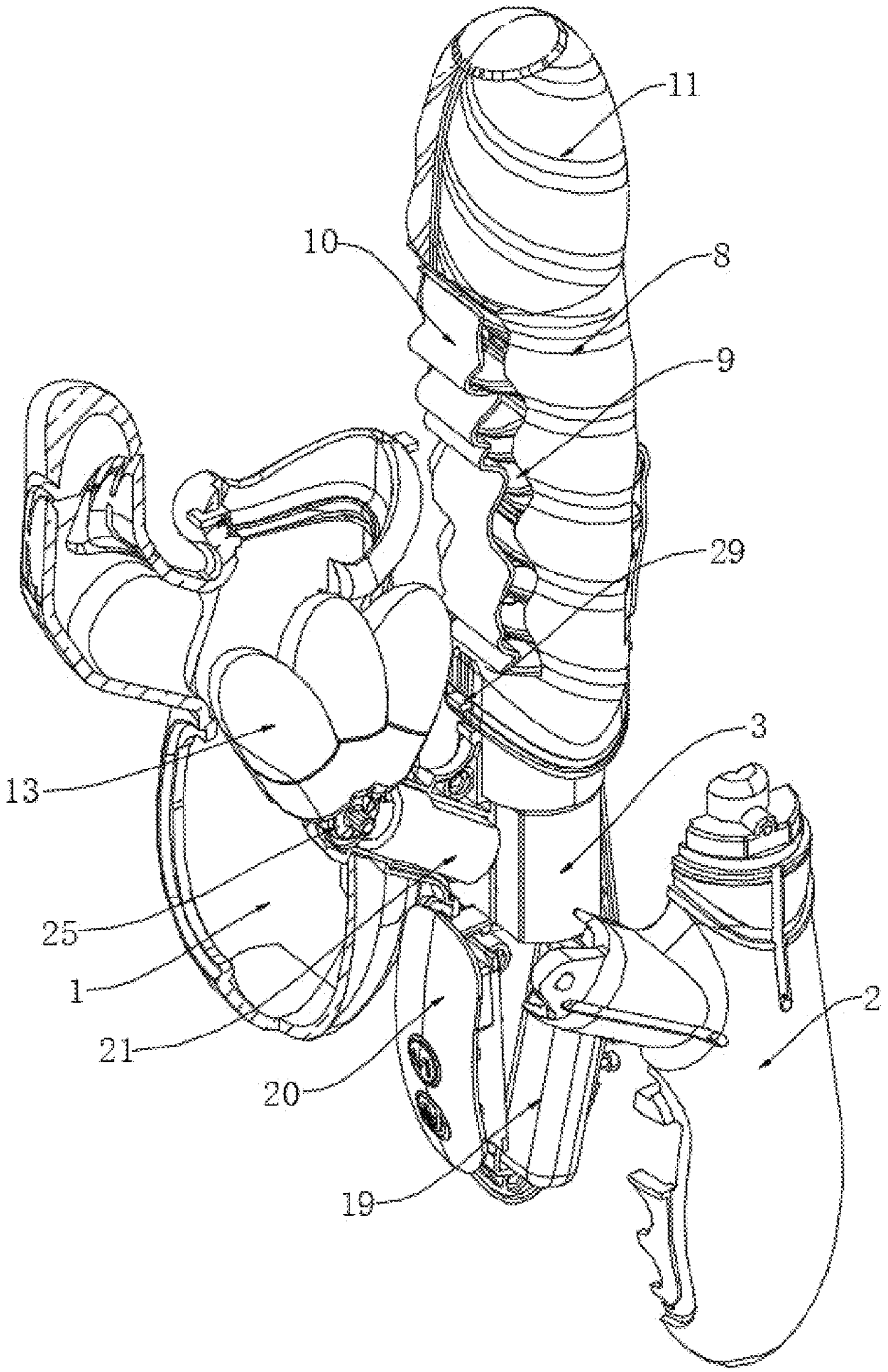
FIG. 3 is a schematic structural diagram of the hard shell in the hollow-structured vibration massager according to the invention.

With reference to FIGS. 1-3, an embodiment provided by the invention: a hollow-structured vibration massager, comprising a soft rubber sleeve 1, which is easy to use and grip to avoid slipping. A hard shell 2 is sleeved inside the soft rubber sleeve 1, and the soft rubber sleeve 1 is elastically sleeved outside the hard shell 2. A first motor 3 is fixed inside the hard shell 2 to provide a driving source. A drive end of the first motor 3 is connected to a main crankshaft 4, and the main crankshaft 4 is driven to rotate by activating the first motor 3. An auxiliary crankshaft 5 is fixed outside the main crankshaft 4, and the auxiliary crankshaft 5 is driven to rotate synchronously by the main crankshaft 4. A plurality of serpentine plates 6 are slidably connected outside the main crankshaft 4, and the serpentine plates 6 are pushed to reciprocate left and right by the rotation of the main crankshaft 4 to achieve the striking of the skin, and the serpentine plates 6 can be wavy, serrated, circular, elliptical, petal-shaped, prismatic, triangular, cross-shaped, trapezoidal, and can be replaced with different shapes according to needs. A soft rubber tube 8 is slidably connected to a top end of the soft rubber sleeve 1, and the soft rubber sleeve 1 is limited so that the soft rubber tube 8 can be stably slidably installed. A hollow opening 9 is provided inside the soft rubber tube 8, and the hollow opening 9 is in the shape of a long strip, so that the serpentine plates 6 can reciprocate back and forth outside the soft rubber sleeve 1 to avoid being unable to move. Rubber pads are fixed to left and right ends of the soft rubber tube, which are used to abut against the serpentine plates 6 to prevent the serpentine plates 6 from directly striking the skin, thereby providing protection. The rubber material of the rubber pad 10 can improve the comfort with the skin. The first motor 3 is configured to drive the main crankshaft 4 and the auxiliary crankshaft 5 to rotate, thereby propelling the serpentine plates 6 into wave-like motion inside the hollow opening 9.

Figure 4:
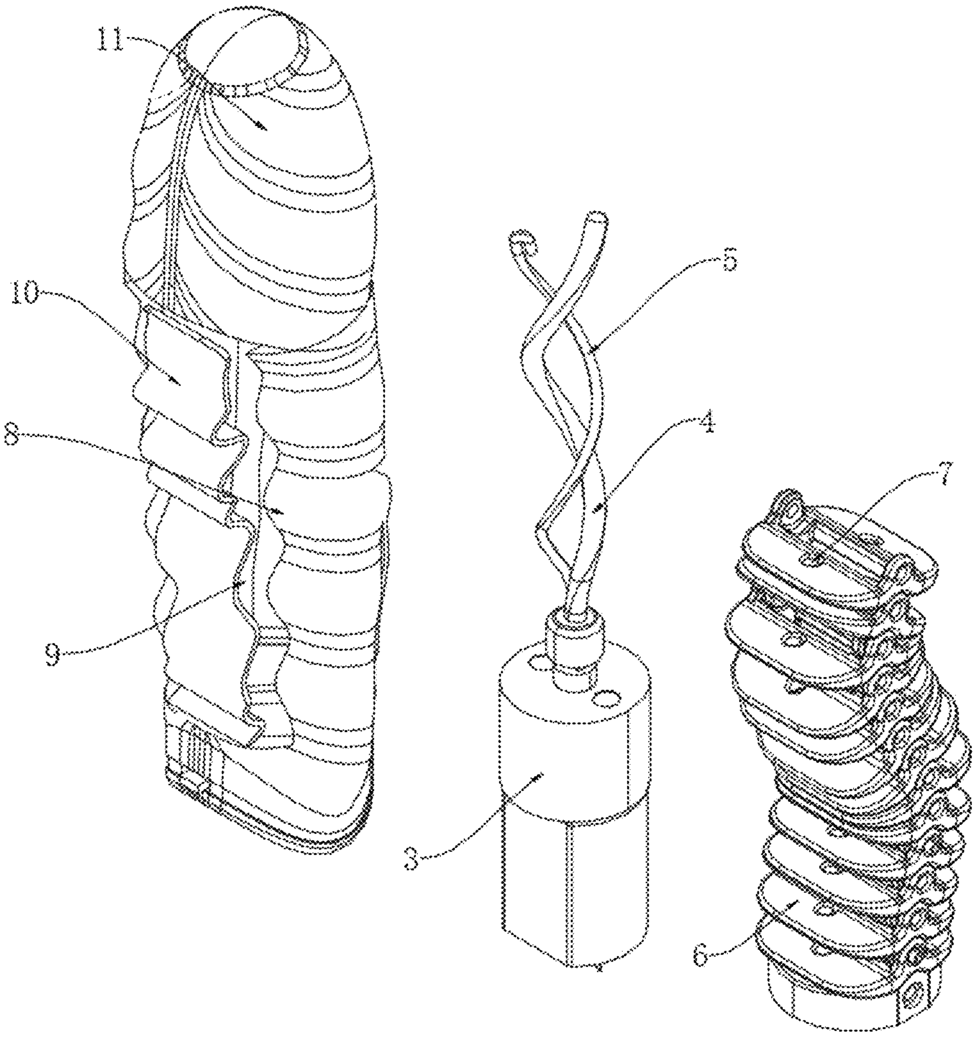
FIG. 4 is a schematic structural diagram of the soft rubber tube in the hollow-structured vibration massager according to the invention.
Figure 5:
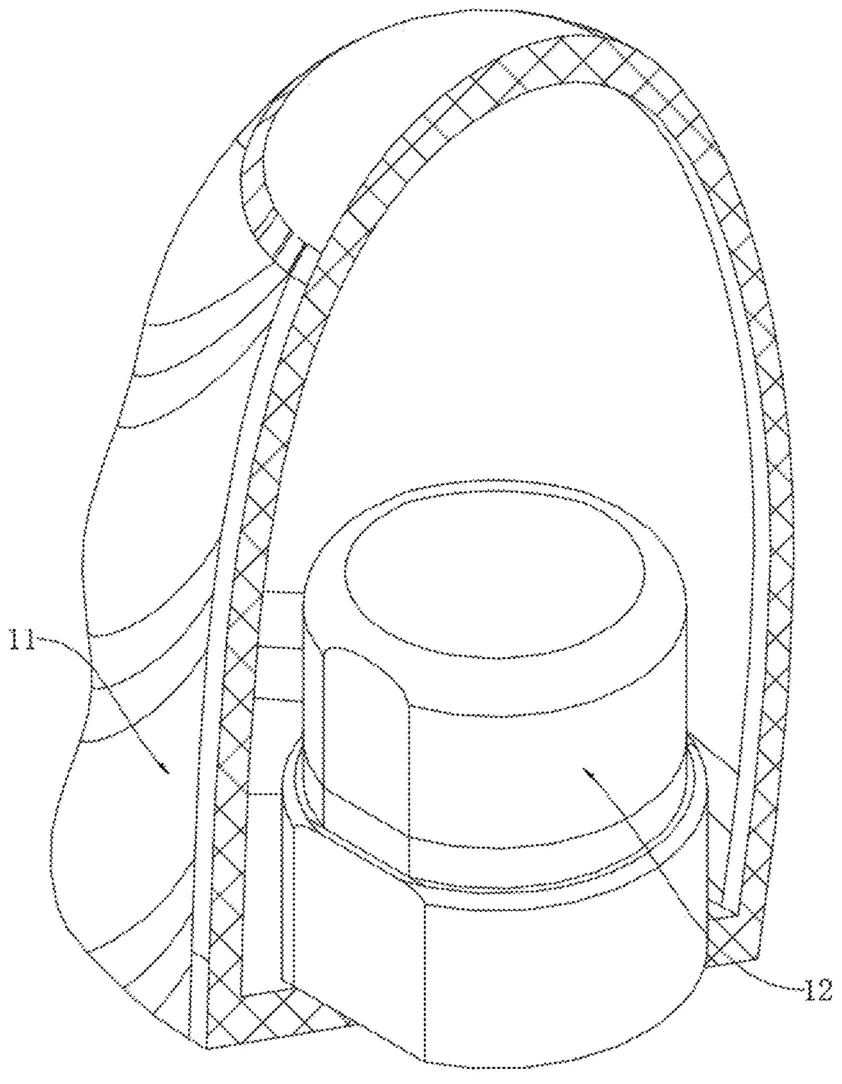
FIG. 5 is a schematic structural diagram of the sleeve head in the hollow-structured vibration massager according to the invention.

With reference to FIGS. 4-5, a sleeve head 11 is fixed to a top of the soft rubber tube 8 and fixed by an adhesive process, thereby providing support for the sleeve head 11. A vibration electric motor 12 is fixed to an inner bottom of the sleeve head 11 to vibrate and transmit the vibration force to the sleeve head 11, and then vibrate the skin, thereby providing a different sense of experience. Two through holes 7 are provided inside the serpentine plate 6 so that an activity space is formed inside the serpentine plates 6. The main crankshaft 4 and the auxiliary crankshaft 5 are slidably connected inside the through holes 7, so that the main crankshaft 4 and the auxiliary crankshaft 5 transmit the rotational force to the serpentine plates 6 and the serpentine plates 6 can reciprocate back and forth.

Figure 6:
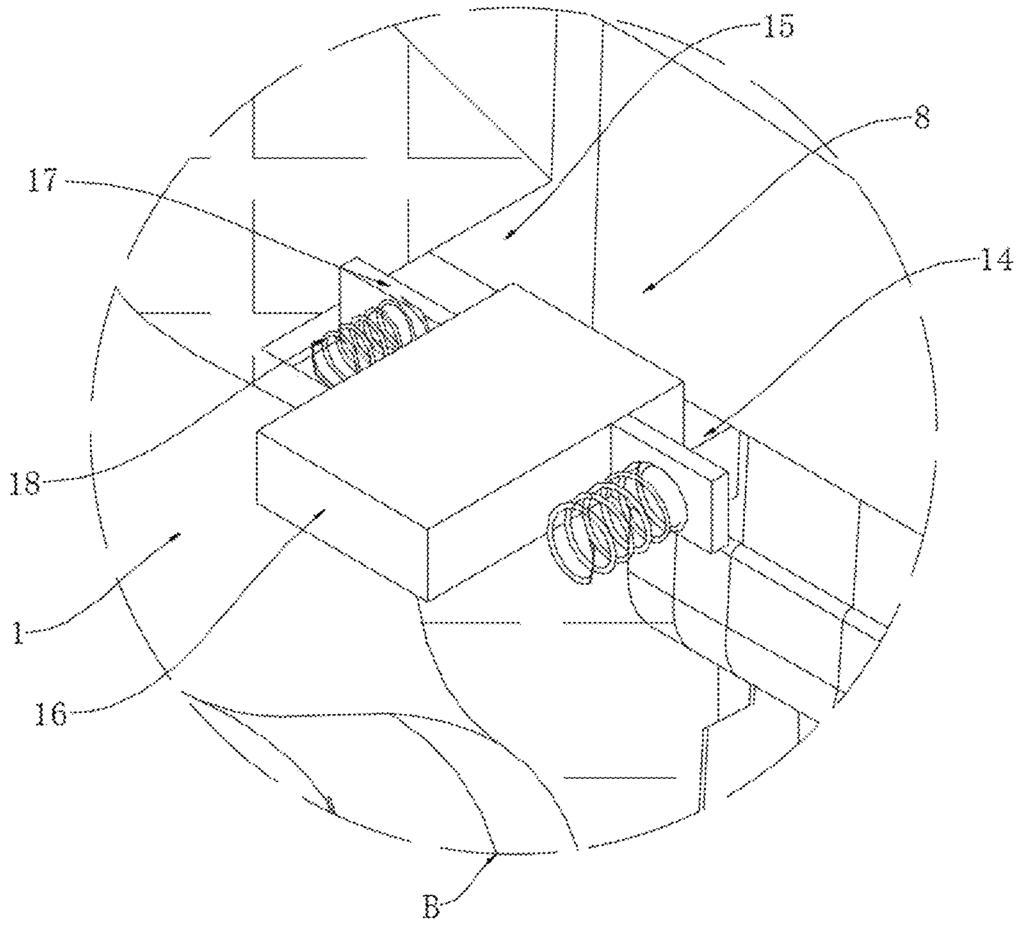
FIG. 6 is an enlarged view of part B in FIG. 2.

With reference to FIGS. 1, 6, and 7, a battery pack 19 is fixed to an inner bottom end of the hard shell 2 to provide electricity. A cover plate 20 is fixed to a left end of the soft rubber sleeve 1. A far side of multiple adjustment columns is in contact with an inner wall of the sleeve head 11, and the sleeve head 11 is supported by the adjustment columns. A third motor 21 is fixed to a left end of the hard shell 2 to provide a driving source. A drive end of the third motor 21 is connected to a crosshead 22, which is driven to rotate by activating the third motor 21. A plurality of rotating disks 23 are fixed outside the crosshead 22, and the rotating disks 23 are two or more overlapping. A transmission column 24 is fixed to a left end of the rotating disk 23, and the rotating force is transmitted to the transmission column 24 through the rotating disks 23. A reciprocating frame 25 is fixed to a left end of the transmission column 24, and the reciprocating frame 25 is driven to reciprocate through the transmission column 24. A fixing frame 26 is fixed outside the reciprocating frame 25, and the force is transmitted to the fixing frame 26 through the reciprocating frame 25. A vibration motor 27 is fixed inside the fixing frame 26 to provide vibration force. An auxiliary head 13 is fixed to a top of the vibration motor 27, and the vibration force is transmitted to the auxiliary head 13 through the vibration motor 27, and the auxiliary head 13 is abut against the skin so that it can vibrate and strike on the skin.

Although the embodiments of the invention have been shown and described, for those of ordinary skill in the art, it can be understood that various changes, modifications, and substitutions can be made to these embodiments without departing from the principle and spirit of the invention. The protection scope of the invention is defined by the appended claims and the equivalents thereof.

What is claimed is:

1. A hollow-structured vibration massager, comprising a soft rubber sleeve, wherein a hard shell is sleeved inside the soft rubber sleeve; a first motor is fixed to the hard shell inside the hard shell, and a drive end of the first motor is connected to a main crankshaft; an auxiliary crankshaft is fixed to the main crankshaft outside the main crankshaft, and a plurality of serpentine plates are connected to the main crankshaft; a soft rubber tube is slidably connected to a top end of the soft rubber sleeve, and a hollow opening is provided inside the soft rubber tube; the first motor is configured to drive the main crankshaft and the auxiliary crankshaft to rotate.

2. The hollow-structured vibration massager of claim 1, wherein rubber pads are fixed to a left end and a right end of the soft rubber tube, and a sleeve head is fixed to a top of the soft rubber tube; a vibration electric motor is fixed to an inner bottom of the sleeve head; a third motor is fixed to a left end of the hard shell, and a drive end of the third motor is connected to a crosshead; a plurality of rotating disks are fixed to the crosshead, and a transmission column is fixed to a left end of the rotating disk; a reciprocating frame is fixed to a left end of the transmission column, and a fixing frame is fixed to the reciprocating frame; a second vibration motor is fixed to the fixing frame, and an auxiliary head is fixed to a top of the second vibration motor.

3. The hollow-structured vibration massager of claim 1, wherein side plates are fixed to a left side and a right side of the soft rubber tube, and sliding plates are slidably connected to a left end and a right end of the soft rubber sleeve.

4. The hollow-structured vibration massager of claim 3, wherein fixing plates are fixed to a front side and a rear side of the sliding plates, and springs are fixed to far sides of the fixing plates.

5. The hollow-structured vibration massager of claim 4, wherein two through holes are provided inside the serpentine plates, and the main crankshaft and the auxiliary crankshaft are slidably connected inside the through holes.

6. The hollow-structured vibration massager of claim 4, wherein limit openings are provided at a left end and a right end of a top of the soft rubber sleeve, and the side plates are slidably connected inside the limit openings.

7. The hollow-structured vibration massager of claim 6, wherein a bottom side of the sliding plates are slidably connected to a top side of the side plates, and far ends of the second springs are respectively fixed to the left and right ends of the top of the soft rubber sleeve.

8. The hollow-structured vibration massager of claim 1, wherein a battery pack is fixed to an inner bottom end of the hard shell, and a cover plate is fixed to a left end of the soft rubber sleeve.

* * * * *